United States Patent [19]

Wheeler et al.

[11] 4,169,514

[45] Oct. 2, 1979

[54] AIR CUSHION VEHICLES

[75] Inventors: Raymond L. Wheeler, East Cowes; Kay Rollins, Ryde; Brian G. Clarke, Niton, all of England

[73] Assignee: British Hovercraft Corporation Limited, Yeovil, England United Kingdom

[21] Appl. No.: 882,908

[22] Filed: Mar. 2, 1978

[51] Int. Cl.[2] ............................................. B60V 1/16
[52] U.S. Cl. .................................................... 180/127
[58] Field of Search ................ 180/116, 121, 127, 128

[56] References Cited

U.S. PATENT DOCUMENTS

| | | | |
|---|---|---|---|
| 3,258,080 | 6/1966 | Williams et al. | 80/127 |
| 3,291,237 | 12/1966 | Hopkins et al. | 180/127 |
| 3,321,039 | 5/1967 | Watts | 180/127 |
| 3,379,271 | 4/1968 | Hopkins et al. | 180/127 X |
| 3,921,753 | 11/1975 | Pont | 180/127 |

FOREIGN PATENT DOCUMENTS

| | | | |
|---|---|---|---|
| 1285331 | 12/1968 | Fed. Rep. of Germany | 180/127 |
| 1110075 | 4/1968 | United Kingdom | 180/127 |

Primary Examiner—Joseph F. Peters, Jr.
Assistant Examiner—Michael Mar
Attorney, Agent, or Firm—Larson, Taylor and Hinds

[57] ABSTRACT

Cushion sealing at the rear of an air cushion vehicle comprises a flexible skirt that is attached to rigid body structure of the vehicle so as to extend downwardly therefrom and define a plurality of inter-communicating inflatable compartments positioned one above the other. These inflatable skirt compartments communicate by way of a first duct with a source of pressurized air on the vehicle, and by way of a second duct with cushion space at the underside of the vehicle. The second duct offers low impedance to the transfer of air between the skirt compartments and the cushion space, whereby in operation, when the skirt is deflected, air transfers from the skirt compartments to the cushion without any substantial rise in the skirt inflation pressure, which would tend to increase the stiffness of the skirt. On the other hand, when the cushion pressure increases to above skirt inflation pressure, air can flow from the cusion to these skirt compartments to increase the stiffness of the skirt so that it maintains its effectiveness as a cushion seal.

4 Claims, 3 Drawing Figures

AIR CUSHION VEHICLES

This invention relates to air cushion vehicles, and is particularly concerned with a flexible skirt assembly forming the cushion sealing means at the rear of an air cushion vehicle. The invention may be used both on amphibious vehicles having cushion sealing around the complete periphery of the vehicle effected by flexible skirts, and on vehicles of the sidewall and surface effect ship type in which sealing of the cushion is effected by rigid sidehulls and fore and aft flexible seals.

That part of a flexible skirt assembly extending across the rear of an air cushion vehicle presents conflicting requirements. In order to minimize pressurized air losses from the cushion at the rear end of the vehicle when it is travelling with a forward component of motion, it is desirable to maintain the lower edge of the skirt assembly in continuous contact with the surface. In attempting to achieve this object, the drag on the forward motion of the vehicle must not be increased to unacceptable levels. A skirt having high stiffness will maintain good contact with an even surface over which it is moving, but will have a low response to deflection on impact with surface undulations, and will tend to dig into the surface, thereby increasing the drag on the forward motion of the vehicle. On the other hand, a skirt having low stiffness will have a good response to deflection on impact with surface undulations, but will not have a high rate of recovery after it has been deflected, thereby allowing large amounts of cushion air to escape.

It has been proposed, for example in U.S. Pat. No. 3,258,080, to form a skirt assembly of flexible sheet material having folds disposed one above the other, each fold extending substantially horizontally so that in vertical cross-section the outer part of the skirt, with respect to the vehicle supporting cushion, is of corrugated form. A skirt of this form may have each cushion facing ridge of the corrugations joined back to the underside of the vehicle structure by a sheet of flexible material so that the skirt comprises a plurality of compartments positioned one above the other, the uppermost compartment being defined in part by the vehicle rigid structure. In operation the skirt is inflated by pressurizd air towards contact with a surface over which the vehicle is operating, and when the lower part of the skirt makes contact with a surface undulation, the folds close and open to allow the skirt to be deflected up and down.

We have found that if a skirt of this construction is arranged so as to be inflated solely by cushion air, then the recovery rate of the skirt after deflection is poor, allowing excessive amounts of cushion air to escape at the rear of the vehicle. If, on the other hand, the skirt is inflated from a source of pressurized air on the vehicle, there is an increase in the stiffness of the skirt as it is deflected by a surface undulation that is brought about by the pressure of the skirt inflation air increasing as the skirt is progressively deflected. Futhermore, if supplied with inflation air from a source on the vehicle, the skirt is unable to sense a rise in cushion pressure such as may be brought about by a large wave entering the cushion at the front of the vehicle, and if the cushion pressure rises to a level above that of the skirt inflation air pressure then the skirt will change its shape due to the pressure differential. and air will escape from beneath the skirt.

It is an object of the present invention to provide cushion sealing means at the rear end of an air cushion vehicle including a skirt of the aforementioned construction having a good response rate to deflection by surface undulations and a high recovery rate after deflection so that the skirt exhibits good surface contouring properites.

Accordingly, the present invention provides an air cushion vehicle having a rigid body structure, means mounted on said rigid body structure for forming a cushion of pressurized air between the underside of the rigid body structure and a surface above which the vehicle is supported during operation, and sealing means attached to and extending downwardly from the rigid body structure for minimizing lateral escape of air from the cushion; the cushion sealing means attached to and extending downwardly from the rear of the vehicle comprizing a skirt formed from flexible impermeable sheet material so as to have an outer part, with respect to the cushion, that is of corrugated form in vertical cross-section with an upper edge attached to the rigid body structure, and a diaphragm member extending from each cushion facing peak of the corrugations inwardly and upwardly to attachment at the underside of the rigid body structure so as to form a plurality of inflatable compartments positioned one above the other, means associated with the diaphrams for providing communication between the compartments, first duct means for communicating between a source of pressurized air on the vehicle and the interior of the skirt whereby during operation the skirt is inflated, and second duct means having a total cross-sectional area that is considerably larger than the total cross-sectional area of the first duct means and whereby during operation when the skirt is deflected air may transfer from the interior of the skirt to the cushion without any substantial rise in the skirt inflation pressure taking place, and whereby air may transfer from the cushion to increase the skirt inflation pressure when the cushion pressure rises.

The first duct means may comprize one or more ducts leading from a plenum area formed by the rigid body structure of the vehicle and to which pressurized air for distribution to the cushion flows from lift fans housed in the rigid body structure.

Alternatively, the first duct means may comprize one or more ducts communicating with a small additional pressure generating fan or a bleed of compressor air from an engine on the vehicle.

The second duct means may comprize one or more ducts defined by rigid body structure of the vehicle so as to have a large cross-section area that allows substantially free transfer of air from the interior of the skirt to the cushion when the skirt is deflected so that it has a good response to deflection. These ducts also allow substantially free transfer of air from the cushion to the interior of the skirt when the cushion pressure rises so that the skirt inflation pressure is maintained at a value that is substantially equal to the cushion pressure and the skirt stiffness is correspondingly increased.

The skirt inflation pressure is preferably in the range of 1.05 to 1.2 times the cushion pressure.

The compartments formed by the skirt may be interconnected by means of holes in the diaphragm members, and the total area of the holes in each diaphragm may be varied so as to provide a pressure differential between the compartments when the skirt is inflated. By this means a skirt may be provided that has varying stiffness from the lower compartment to the upper compartment.

That section of the lower part of the skirt which in operation makes contact with the surface over which the vehicle is operating will be subject to a high degree of abrasion, and it may be found beneficial to reinforce this section of the skirt in order to enhance the wear resistant properties. Such reinforcement may be in the form of one or more layers of a high wear resistant material, such as Polyurethane, attached by bonding or other fastening means onto this section of the skirt. Alternatively, the reinforcement may be achieved by increasing the local thickness of the skirt material over this section.

Various embodiments of the invention will now be described, by way of example, with reference to the accompanying drawings, in which.

Figure 1:
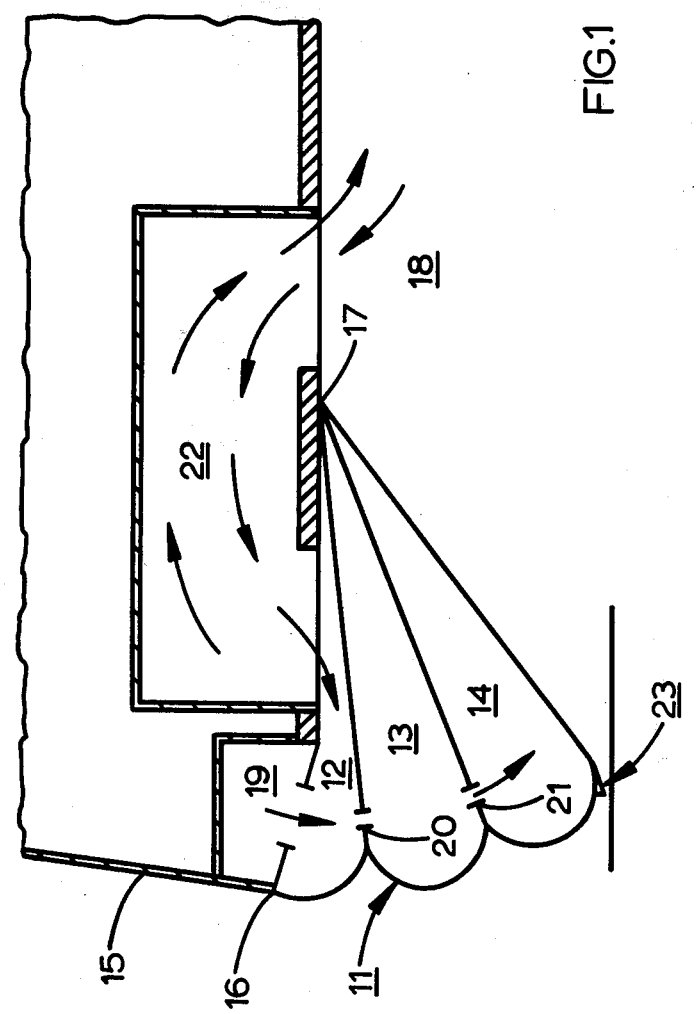
FIG. 1 is a transverse cross-section through cushion sealing means at the rear end of an air cushion vehicle in accordance with one embodiment of the invention.

In the embodiment of the invention shown in FIG. 1, a skirt 11 that is manufactured from flexible impermeable sheet material so as to have three compartments 12, 13 and 14, is attached to rigid body structure 15 of an air cushion vehicle (not shown in full) at an outer hinge line 16 and an inner hinge line 17, so as to extend across the rear end of the vehicle to form a seal that minimizes escape of pressurized air from the vehicle supporting air cushion 18. A flow of pressurized air to inflate the skirt 11 passes to the upper compartment 12 from first duct means comprizing a supply duct 19 that is defined by rigid body structure of the vehicle. The duct 19 communicates with a plenum chamber (not shown) that is defined by rigid structure of the vehicle, and which receives a flow of pressurized air from the vehicle lift fans (not shown) for distribution to the cushion 18. The pressurized air passes from the upper compartment 12 by way of feed holes 20 to the middle compartment 13, and from the middle compartment 13 it passes by way of feed holes 21 to the lower compartment 14 so that the skirt is fully inflated. Second duct means comprizing two transfer ducts 22 (only one being shown in FIG. 1), are formed in the rigid body structure so as to be positioned one on either side of the vehicle longitudinal centreline. The transfer ducts communicate between the upper compartment 12 of the skirt 11 and the cushion 18. The lowermost part of the skirt 11 is provided with planing wedges 23.

In the embodiment shown in FIG. 1, the two transfer ducts 22 have a total transverse cross-sectional area that is four times the cross-sectional area of the supply duct 19. The total areas of the holes 20 and 21 interconnecting the compartments 12, 13 and 14, respectively, are the same, so that for the purposes of the present description it will be assumed that the inflation pressure of the three compartments is equal. In practice, however, it is necessary to provide water drain holes (not shown) at the bottom of the skirt so that in operation there is a small air flow from the bottom compartment 14 that gives rise to a pressure drop across the three compartments.

At commencement of an operation, when the vehicle lift fans are started up, the skirt 11 will be inflated by pressurized air flowing into it from the plenum chamber (not shown) through supply duct 19, and from the cushion 18 through the transfer ducts 22, until the vehicle reaches a static hovering condition. In this static hovering condition, the pressure of the air in the plenum chamber (not shown), with which the supply duct 19 communicates, is higher than cushion pressure so that there is an air flow from the plenum chamber to the cushion 18 by way of the skirt 11 and the transfer ducts 22. Whilst the transfer ducts 22 present a low impedance to the flow of air from the skirt relative to the impedance that is presented by the supply duct 19 should skirt inflation try to flow out of the skirt through the supply duct 19, the impedance of the transfer ducts 22 is not zero, resulting in a pressure differential between the skirt and the cushion.

In the dynamic condition, when the vehicle is under way, and the skirt is deflected upwardly by a wave, air in the skirt is vented into the cushion through the transfer ducts 22 because due to their large cross-sectional area they present low impedance to air being forced out of the skirt without any substantial rise in skirt inflation pressure and little increase in its stiffness. In a reverse situation, when a wave enters the cushion at the forward end of the vehicle so as to cause cushion forcing, i.e. an increase in cushion pressure to a value in excess of the skirt inflation pressure, the pressure of the air inflating the skirt is adjusted to a value that corresponds substantially with the higher pressure of the cushion by an air flow from the cushion into the skirt through the transfer ducts 22, so that the effectiveness of the skirt is substantially maintained.

The stiffness of the skirt shown in FIG. 1 may be varied from the lower compartment 14 to the upper compartment 12 by adjustment of the total cross-sectional area of the feed holes 20 and 21. For example, if the total cross-sectional area of the feed holes 20 is larger than the total cross-sectional area of the feed holes 21, then the lower compartment 14 will be at a lower pressure than the compartments 12 and 13, and because the stiffness of the lower compartment is reduced, that area of the skirt which is adjacent to the ground surface is deflected locally when contact is made with small surface undulations and overall deflection of the skirt does not occur.

Figure 2:
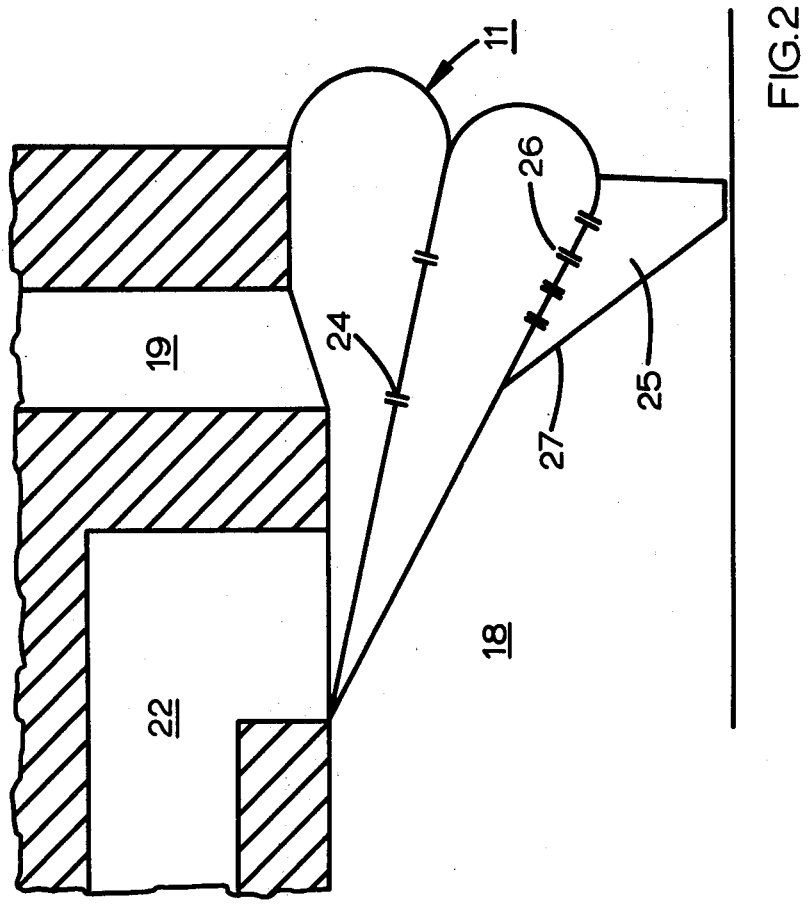
FIG. 2 is a transverse cross-section through cushion sealing means at the rear end of an air cushion vehicle in accordance with a second embodiment of the invention.

The skirt shown in FIG. 1 incurs drag penalty because it presents a continuous lower surface across the rear of the vehicle. This drag penalty may be substantially reduced by attaching to the lower ground facing surface of the skirt a plurality of those independent flexible members that are known in the art as cones, such an arrangement being shown in the embodiment of FIG. 2 in which the skirt 11 comprizes two compartments interconnected by feed holes 24. The cone members 25 are formed from flexible impermeable sheet material, and are attached to the skirt by suitable fixing means (not shown), such as bolting. A number of holes 26 are provided in the lower portion of the skirt coincident with each cone to allow pressurized air to flow from the skirt into the cones, so that they are inflated. The cones 25, shown in FIG. 2, are so formed and attached to the skirt that their cushion facing surfaces 27 are presented to a water surface over which the vehicle operates at an angle that will tend to make them plane over a wave that is passing beneath the skirt.

Figure 3:
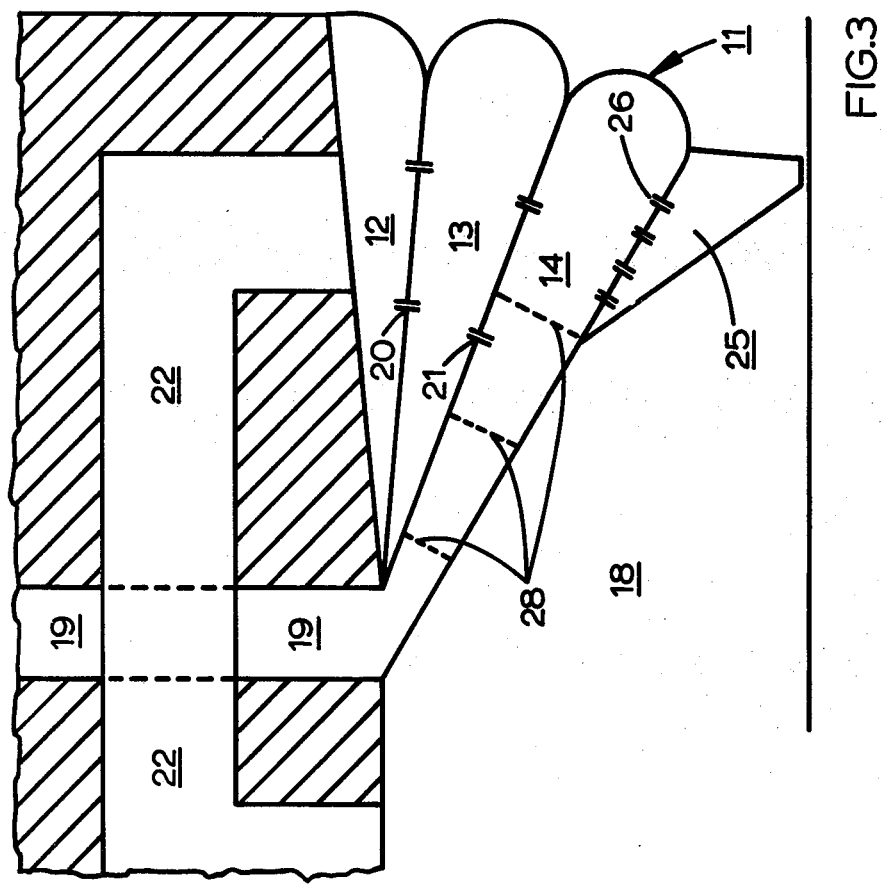
FIG. 3 is a transverse cross-section through cushion sealing means in a third embodiment of the invention.

In the embodiment of the invention shown in FIG. 3, a skirt of the form shown in FIG. 1 is provided with a plurality of cones 25 similar to the cones hereinbefore described with reference to and shown in FIG. 2. In this embodiment, however, the lower compartment 14 of the skirt 11 is arranged to receive the flow of inflation air from the supply duct 19, and the compartments 13 and 12 are inflated by air flowing through the feed holes 21 and 20, respectively, in the reverse order to that described for the embodiment of FIG. 1. The areas of the feed holes are arranged so that the pressure in the upper compartment 12 corresponds substantially to cushion pressure. To prevent excessive deformation of the cushion facing wall of the skirt 11, retaining ties 28 may be provided that extend between attachment with the cushion facing wall of the skirt and the diaphragm that separates the lower compartment 14 from the centre compartment 13. In this skirt arrangement the stiffness of the lower compartment 14 is such as to provide a firm base for attachment of the cones 25 so that they will be inflated to their correct shape by air flowing into them from the lower compartment through the feed holes 26.

Of course, these embodiments are by way of example only, and modifications are possible. For instance, in an embodiment of the invention having a skirt such as is shown in FIG. 1, when the skirt inflation pressure is required to be substantially equal in all of the compartments of the skirt, then the communication between the compartments may be provided by cutting away portions of the internal diaphragms at those edges of these diaphragms that are attached back to the underside of the vehicle. Alternatively, these diaphragms may have scalloped edges and be attached back to the vehicle by tie members.

We claim as our invention:

1. In an air cushion vehicle comprising a rigid body structure, means for forming an air cushion beneath said rigid structure including cushion sealing means attached to and extending downwardly from the rigid body structure for minimizing lateral escape of air from the cushion, the cushion sealing means attached to and extending downwardly from the rear of the vehicle comprising a skirt of flexible impermeable sheet material, said skirt having an outer part of corrugated form in vertical cross section, said outer part having the upper edge attached to the rigid body structure, a diaphragm member extending from each cushion facing peak of the corrugations inwardly and upwardly to attachment at the underside of the rigid body structure so as to form a plurality of inflatable compartments positioned one above the other, and means associated with the diaphragms for providing communication between the compartments, the improvement comprising means for inflating the compartments and for regulating the air pressure within the compartments and the air cushion, said last named means including first duct means formed in said rigid body structure of the vehicle and forming communication from a source of pressurized air on the vehicle and the interior of the skirt for inflating the compartments of the skirt, and second duct means formed in the rigid body structure of the vehicle and forming unrestricted communication between the interior of the skirt and the air cushion beneath said rigid structure, said second duct means having a total cross sectional area considerably larger than the total cross sectional area of the first duct means whereby during operation said first duct means provides pressurized air for inflating said skirt and said second duct means provides for unrestricted flow of air from the interior of the skirt to the air cushion when the skirt is deflected thereby preventing a substantial rise in the skirt inflation pressure and whereby air may be transferred through the second duct means from the air cushion to the interior of the skirt to increase the skirt inflation pressure when the air cushion pressure increases.

2. An air cushion vehicle as claimed in claim 1, wherein the means associated with the diaphragms for providing communication between the compartments comprize holes cut in all but the lowermost diaphragm that forms the cushion facing wall of the skirt.

3. An air cushion vehicle as claimed in claim 2, wherein the total cross-sectional area of the holes cut in each said diaphragm is substantially equal.

4. An air cushion vehicle as claimed in claim 1, wherein said first duct means communicates with the lower compartment of the skirt.

* * * * *